(12) United States Patent
Deguchi et al.

(10) Patent No.: US 7,417,217 B2
(45) Date of Patent: Aug. 26, 2008

(54) REGRESSIVE REFLECTION TYPE PHOTOELECTRIC SWITCH

(75) Inventors: Tomoki Deguchi, Osaka (JP); Shinichi Tsukigi, Osaka (JP)

(73) Assignee: Keyence Corporation, Osaka (JP)

( * ) Notice: Subject to any disclaimer, the term of this patent is extended or adjusted under 35 U.S.C. 154(b) by 91 days.

(21) Appl. No.: 11/452,674

(22) Filed: Jun. 14, 2006

(65) Prior Publication Data

US 2006/0278815 A1 Dec. 14, 2006

(30) Foreign Application Priority Data

Jun. 14, 2005 (JP) ............. P 2005-173588

(51) Int. Cl.
*G02B 7/00* (2006.01)
(52) U.S. Cl. ................ 250/221; 250/216; 250/214 SW; 250/239
(58) Field of Classification Search ......... 250/225, 250/216, 221, 214 SW; 372/101
See application file for complete search history.

(56) References Cited

U.S. PATENT DOCUMENTS 6,249,338 B1 * 6/2001 Ohtomo .............. 356/4.08

2003/0214898 A1 * 11/2003 Ogata ............... 369/112.24
2005/0135219 A1 * 6/2005 Oka ................ 369/112.05
2006/0279867 A1 12/2006 Deguchi et al.

FOREIGN PATENT DOCUMENTS

JP A-10-255611 9/1998
JP A-2002-246636 8/2002

* cited by examiner

*Primary Examiner*—Georgia Y. Epps
*Assistant Examiner*—Tony Ko
(74) *Attorney, Agent, or Firm*—Kilyk & Bowersox, P.L.L.C.

(57) ABSTRACT

A concave curved surface 95 is formed on a light inputting surface 93 of a light emitting lens 43, and a convex curved surface 96 is formed on a light emitting surface 94. Only laser light close to an optic axis A is inputted to the concave curved surface 95, and a spread angle is enlarged, and thereby, it is possible to make intensity distribution more uniform, and to reduce an error on the occasion of comparing a received light amount of reflected light with a threshold value, and therefore, even if a light receiving surface is small, it is possible to detect an object with high accuracy.

4 Claims, 8 Drawing Sheets

REGRESSIVE REFLECTION TYPE PHOTOELECTRIC SWITCH

TECHNICAL FIELD

The present disclosure relates to a regressive reflection type photoelectric switch. More particularly, the present disclosure relates to improvement of a shape of a light emitting lens which converts laser light, that is irradiated from a light emitting element, into nearly parallel light.

RELATED ART

Figure 8:
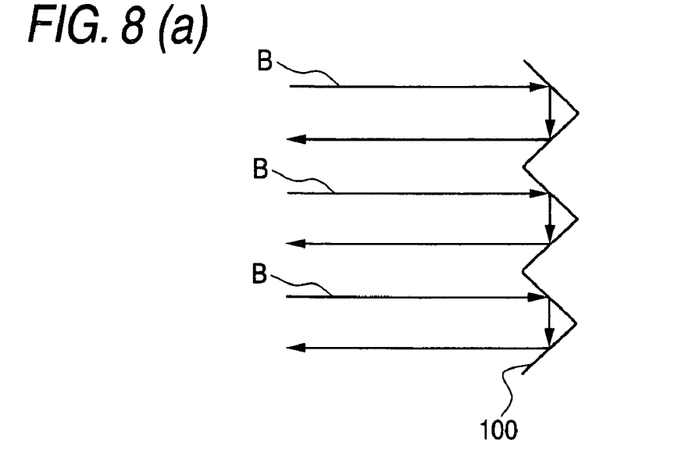

A regressive reflection type photoelectric switch has been known as a reflection type photoelectric switch which receives reflected light of light irradiated from a light emitting element, by a light receiving element, and detects an object on the basis of its amount of light received, (e.g., Japanese Patent Unexamined Publication No. 2002-246636 and Japanese Patent Unexamined Publication No. 10-255611) In the regressive reflection type photoelectric switch, laser light is irradiated toward a regressive reflection plate on which a three-dimensional reflection surface was formed by such a matter that a lot of protruding portions of a three-dimensional shape such as a polyangular cone shape and a spherical shape are disposed. Then, reflected light from the regressive reflection plate is received by a light receiving element. FIGS. 8 (a)-(c) are pattern views each of which shows one example of a reflection mode of laser light in a three-dimensional reflection surface 100 in the regressive reflection plate.

In a path of laser light which heads off from a light emitting element to a regressive reflection plate, a light emitting polarization plate, which allows passage of only so-called P polarized light, is disposed. Thus, only P polarized light among light irradiated from the light emitting element passes through the light emitting polarization plate, and heads off to the regressive reflection plate. In an example shown in FIG. 8 (a), on the regressive reflection plate, a three-dimensional reflection surface 100 is formed by such a matter that a lot of plural protruding portions (so-called sites) of triangular shape in section are disposed. Each site of the three-dimensional reflection surface 100 is configuring a plurality of flat surfaces which intersect with one another by an angle of 90°, and laser light B, which is inputted to the regressive reflection plate, is reflected by the three-dimensional reflection surface 100, and thereby, a traveling direction of laser light B is changed by nearly 180°. The regressive reflection plate has a function of changing an angle of a polarization plane of P polarized light which is inputted, by 90° so as to reflect it as so-called S polarized light. In a path heading off from the regressive reflection plate to the light receiving element, a light receiving polarization plate, which allows passage of only S polarized light, is disposed, and S polarized light from the regressive reflection plate passes through this light receiving polarization plate, and is received by the light receiving element. Here, it will be explained about such a case that irradiated light from the light emitting element is P polarized light and reflected light from the regressive reflection plate is S polarized light. However, this is one example, and it is all right even if irradiated light from the light emitting element is S polarized light and reflected light from the regressive reflection plate is P polarized light. The P polarized light and S polarized light are defined by a direction to a light inputting surface.

If an object does not exist in between the light emitting element and the regressive reflection plate, P polarized light heading off from the light emitting element to the regressive reflection plate is reflected by the regressive reflection plate, and becomes S polarized light. Then, S polarized light is received by the light receiving element, and thereby, relatively considerable amount of light received is obtained in the light receiving element. On the one hand, in case. that an object exists in between the light emitting element and the regressive reflection plate, reflected light is not almost received by the light receiving element. That is, a mirror, surface object exists in between the light emitting element and the regressive reflection plate, P polarized light from the light emitting element does not become S polarized light on the occasion that it is reflected by a mirror surface. It is reflected as P polarized light without change, and therefore, the reflected P polarized light can not pass through the light receiving polarization plate, and does not reach to the light receiving element. In addition, in case that a non-mirror surface object exists in between the light emitting element and the regressive reflection plate, P polarized light from the light emitting element is not reflected sufficiently by the object, and therefore, reflected light does not reach to the light receiving element. Because of diffuse reflection, polarized light becomes random, but does not come back as parallel light, and therefore, it becomes sufficiently small to reflected light from the regressive reflection plate.

There is fluctuation of accuracy in a reflection angle of laser light in the three-dimensional reflection surface 100 of the regressive reflection plate. That is, in an example shown in FIG. 8 (b), because of angular fluctuation of the three-dimensional reflection plate 100, a traveling direction of laser light B, which is inputted to the three-dimensional reflection surface 100, is not converted by an angle of 180° with high accuracy. In addition, in an example shown in FIG. 8 (c), because of undulation, which is generated on a base material 101 on which the three-dimensional reflection surface 100 is formed, or is generated on a protective sheet 102 which is attached to the three-dimensional reflection surface 100, angular fluctuation of the three-dimensional reflection surface 100 is generated. Laser light, which is inputted to the regressive reflection plate, is reflected by the three-dimensional reflection surface, and thereafter, returned over spreading by a predetermined spread angle, but some errors may be observed partially in a spread angle of laser light, due to accuracy fluctuation etc. of the reflection angle of laser light as shown in FIGS. 8 (b), (c). Therefore, if a receiving surface of reflected light in a switch main body (such a surface that reflected light is inputted to the switch main body) is widened, light reflected by a lot of sites in the three-dimensional reflection surface of the regressive reflection plate is inputted to the switch main body. Thus, an error on the occasion of comparing an amount of light received with a threshold value is small, and it is possible to detect an object with higher accuracy. However, when the light receiving surface of reflected light in the switch main body is widened, an outer shape of the main body becomes large by that much, and therefore, there is such a problem that it is not possible to realize miniaturization of the main body.

In addition, depending on amounting position of the regressive reflection plate, the regressive reflection plate vibrates and a spot position in the regressive reflection plate varies, and it is conceivable that this is a main cause of such a matter that it is not possible to detect an object favorably. In addition, in the suchlike case, a large error is observed in a spread angle of reflected light at a spot position on the regressive reflection plate and a spread angle and a spreading direction of reflected light from each site change considerably. Therefore, an amount of light from each side fluctuates, and fluctuation of an amount of light received becomes large, and there is such a problem that it is not possible to detect an object favorably.

SUMMARY

Embodiments of the present invention provide a small size regressive reflection type photoelectric switch which can detect an object with high accuracy.

According to an aspect of one or more embodiments of the invention, a regressive reflection type photoelectric switch which receives reflected light of irradiated light, which is reflected by a regressive reflection plate, and detects an object on the basis of its amount of light received, comprises: a light emitting element which irradiates laser light; a regressive reflection plate which reflects the laser light irradiated from the light emitting element; a light receiving, element which receives reflected light of the laser light, which is reflected by the regressive reflection plate; and a light emitting lens which converts the laser light into nearly parallel light and which has a light inputting surface to which the laser light, which is irradiated from the light emitting element, is inputted, and a light emitting surface which emits the laser light. The light emitting lens is configured in such a manner that a concave curved surface is formed on the light inputting surface, and a convex curved surface is formed on he light emitting surface.

According to the suchlike configuration, a spread angle to an optic axis of laser light, which is inputted from the light emitting element to the light emitting lens, is enlarged by the concave curved surface formed on the light inputting surface, and thereafter, it is reduced by the convex curved surface formed on the light emitting surface, and thereby, it is possible to convert laser light into nearly parallel light. Laser light has such a characteristic that the more it is proximate to an optic axis, the more its intensity distribution becomes uniform, and the more it is separated from an optic axis, the more its intensity distribution becomes non-uniform. Therefore, only laser light, which is close to an optic axis is inputted to the concave curved surface, and its spread angle is enlarged, and thereby, it is possible to emit parallel light having more uniform intensity distribution, from the convex curved surface. In this manner, miniaturization becomes possible over keeping intensity distribution uniform.

In addition, intensity distribution of laser light is made more uniform, and thereby, it is possible to input laser light with uniform intensity to as many sites as possible, without enlarging an irradiation range. By this means, even if there is fluctuation in a spread angle and a spreading direction due to variation of sites, it is possible to reduce fluctuation of amount of light received, in whole.

If intensity distribution of light emitted from the light emitting lens is uniform, it is possible to reduce an error on the occasion of comparing an amount of light received of reflected light with a threshold value, and therefore, even if a reflected light receiving surface in the switch main body is small, it is possible to detect an object with high accuracy. In addition, even in case that the regressive reflection plate is vibrating, fluctuation quantity of a received light amount in the light receiving element is small, and it is possible to detect an object favorably. Therefore, even if the switch main body is miniaturized by reducing a light receiving surface, it is possible to detect an object with high accuracy.

In addition, in the regressive reflection type photoelectric switch according to the invention, when it is viewed on a plane surface, an area of the concave curved surface is smaller than an area of the convex curved surface.

According to the suchlike configuration, by emitting laser light, a spread angle of which is enlarged by the concave curved surface of the light emitting lens, from the convex curved surface having a larger area than that of the concave curved surface, it is possible to convert laser light into nearly parallel light favorably and to emit it. Therefore, intensity distribution of laser light can be made uniform, and it is possible to shorten a distance of the light emitting element and the light emitting lens, by reducing the concave curved surface.

In addition, the regressive reflection type photoelectric switch according to the present invention comprises a beam splitter which allows passage of the laser light from the light emitting lens toward the regressive reflection plate, and reflects reflected light by the regressive reflection plate, toward the light receiving element.

According to the suchlike configuration, the light emitting element, the light emitting lens and the beam splitter are disposed in this order, along a laser light irradiation direction. In this manner, in case of such a configuration that the beam splitter is disposed on the same straight line as the light emitting element and the light emitting lens, it is not possible to ensure a very large distance between the light emitting element and the light emitting lens, in order to miniaturize a switch main body, but by enlarging a spread angle of laser light inputted from the light emitting element to the light emitting lens through the use of the concave curved surface, it is possible to obtain nearly parallel light having a sufficient irradiation range on the convex curved surface. In addition, by utilizing the concave curved surface, it is possible to make intensity distribution in the irradiation range uniform, and therefore, it is possible to obtain the same advantage as in the case that the light emitting element and the light emitting lens are separated in terms of a distance. Therefore, even in case of a configuration equipped with a beam splitter, it is possible to realize miniaturization over keeping an irradiation range and intensity distribution in the irradiation range, and it is possible to reduce deviance of an optic axis, which goes with enlargement of a distance of the light emitting element and the light emitting lens, and therefore, it is possible to provide a small side regressive reflection type photoelectric switch which can detect an object with high accuracy.

In addition, in the regressive reflection type photoelectric switch according to the present invention, the beam splitter has only predetermined linear polarized light toward the regressive reflection plate, and reflects only reflected light, whose a polarization plane was changed by the regressive reflection plate, toward the light receiving element.

According to the suchlike configuration, for example, in such a regressive reflection type photo electric switch that only P polarized light, among laser light inputted to a beam splitter, is passed through, and an angle of a polarization plane of P polarized light inputted on a regressive reflection plate is changed by 90°, and thereby, it is converted into S polarized light, and that S polarized light is reflected by the beam splitter and received by a light emitting element, it is possible to realize miniaturization and high accuracy.

In addition, in the regressive reflection type photoelectric switch according to the present invention, a slit, which has a shape corresponding to a shape of the concave curved surface and through which the laser light heading off from the light emitting element to the light emitting lens passes, is disposed.

According to the suchlike configuration, laser light heading off from the light emitting element to the light emitting lens passes through the slit, and thereby, it is possible to irradiate only the concave curved surface of the light emitting lens with laser light. By this means, it is possible to suppress noises at the time of detection, which are generated by such a matter that laser light is inputted to a portion other than the concave curved surface on a light inputting surface of the light emitting lens, and therefore, it is possible to detect an object with high accuracy.

Various implementations may include one or more the following advantages. For example, a spread angle to an optic axis of laser light, which is inputted to the light emitting lens, is enlarged by the concave curved surface and thereafter, is reduced by the convex curved surface and thereby, it is possible to convert laser light into nearly parallel light. Only laser light close to the optic axis is inputted to the concave curved surface and its spread angle is enlarged, and thereby, it is possible to emit nearly parallel light with more uniform intensity distribution, from the convex curved surface, and therefore, it is possible to reduce an error on the occasion of comparing a received light amount of reflected light with a threshold value, and even if a light receiving surface for reflected light in the switch main body is small, it is possible to detect an object with high accuracy. In addition, even in case that the regressive reflection plate is vibrating, fluctuation quantity of a received light amount on the light receiving element is small, and it is possible to detect an object favorably.

In addition, by such a configuration that the beam splitter is disposed, even in a configuration that it is not possible to ensure a very large distance between the light emitting element and the light emitting lens, it is possible to obtain nearly parallel light having a sufficient irradiation range on the convex curved surface by enlarging a spread angle of laser light inputted to the light emitting lens, by the concave curved surface, and it is possible to detect an object with high accuracy.

In addition, laser light heading off from the light emitting element to the light emitting lens passes through the slit, and thereby, laser light is irradiated only to the concave curved surface of the light emitting lens, and it is possible to suppress noises at the time of detection, which are generated by such a matter that laser light is inputted to a portion other than the concave curved surface on an light inputting surface of the light emitting lens, and therefore, it is possible to detect an object with high accuracy.

Other features and advantages may be apparent from the following detailed description, the accompanying drawings and the claims.

BRIEF DESCRIPTION OF THE DRAWINGS

FIG. 5 (a) is a perspective view from the side opposite to the light emitting element of a light emitting lens of FIG. 3.

FIG. 5 (b) is a perspective view from the light emitting element side of a light emitting lens of FIG. 3.

FIG. 6 (a) is a schematic light path view which shows an appearance of laser light on the occasion of passing through the light emitting lens of the embodiment of the present invention.

FIG. 6 (b) is a schematic light path view which shows an appearance of laser light on the occasion of passing through the light emitting lens of the related art.

FIG. 7 (a) is a view which schematically shows intensity distribution of laser light on the occasion of passing through each light emitting lens of FIG. 6 (a).

FIG. 7 (b) is a view which schematically shows intensity distribution of laser light on the occasion of passing through each light emitting lens of FIG. 6 (b).

FIGS. 8 (a) to (c) are pattern views each of which shows one example of a reflection mode of laser light in a three-dimensional reflection surface in a regressive reflection plate.

DETAILED DESCRIPTION

Figure 1:
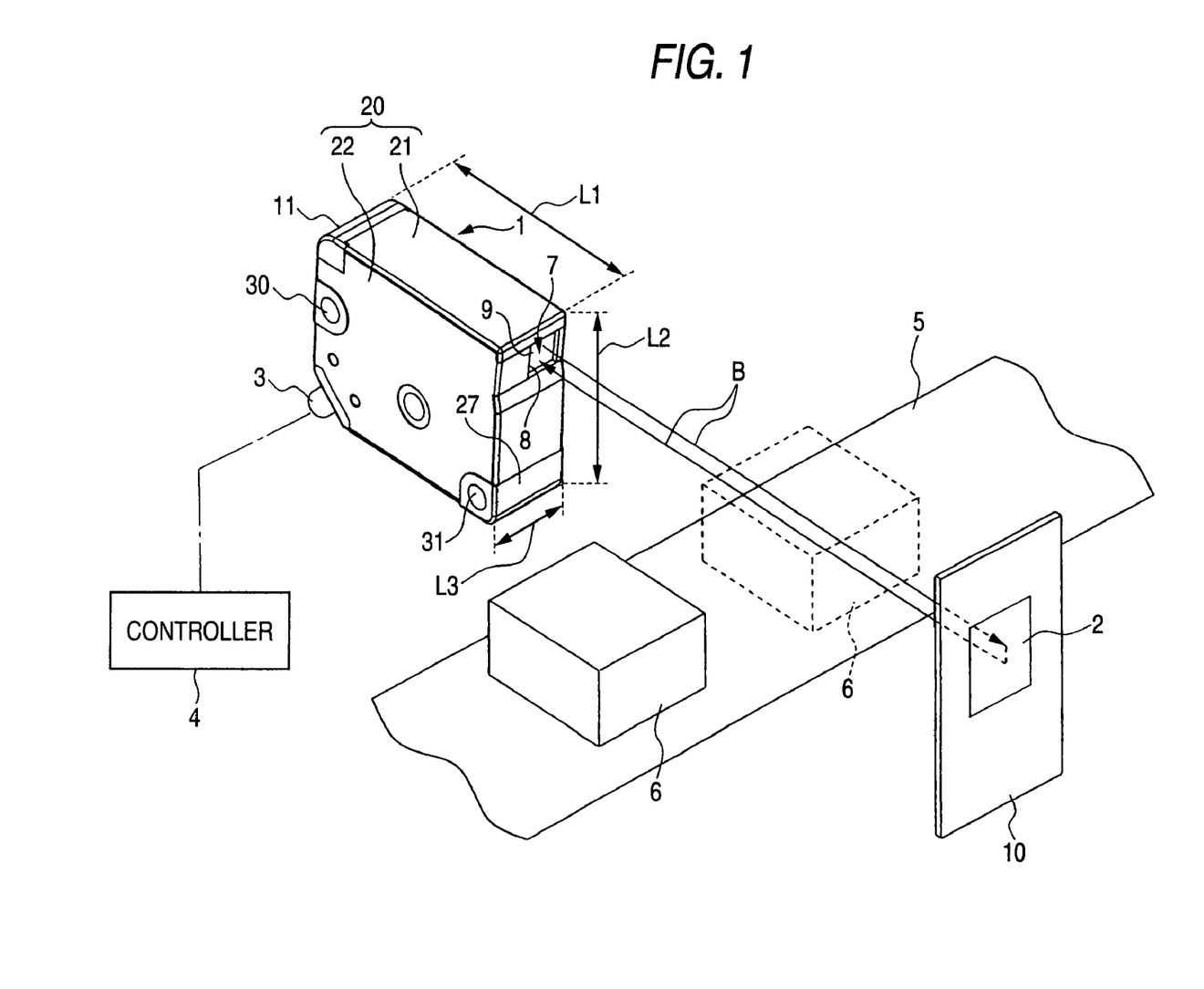
FIG. 1 is a schematic view which shows one configuration example of a regressive reflection type photoelectric switch according to an embodiment of the present invention.

FIG. 1 is a schematic diagram which shows one configuration example of a regressive reflection type photoelectric switch according to an embodiment of the present invention. As shown in FIG. 1, this regressive reflection type photoelectric switch comprises a switch main body 1, a regressive reflection plate 2, and a controller 4. The switch main body 1 irradiates laser light B from a light emitting element and receives its reflected light by a light receiving element. The regressive reflection plate 2 reflects laser light B irradiated from the switch main body 1. The controller 4 is connected to the switch main body 1 through a cable 3 to control an operation of the switch main body 1.

This regressive reflection type photoelectric switch is disposed in a factory etc., and for example as shown in FIG. 1, used for detecting an object 6 which is conveyed on a belt conveyor 5. The switch main body 1 and the regressive reflection plate 2 are disposed so as to sandwich a conveying path of the object 6, and laser light B is irradiated so as to intersect with the conveying path, heading off from the switch main body 1 toward the regressive reflection plate 2. At the time of detection by this photoelectric switch, an indicating lamp 11, which is attached to the switch main body 1, is turned on, and thereby, it is notified that it is in a detecting state.

When the object 6 does not exist between the switch main body 1 and the regressive reflection plate 2, laser light B, which was irradiated from the switch main body 1, reaches to the regressive reflection plate 2 without being blocked by the object 6. Then, laser light B, which is reflected by the regressive reflection plate 2, is inputted form a light receiving surface 7 formed on a side surface of the switch main body 1 to an inside of the switch main body 1. In this embodiment, the light receiving surface 7 is configured by a transparent plate 9 such as an acrylic plate, which was fitted into a nearly rectangular opening 8 formed on a side surface of the switch main body 1. Laser light B, which is irradiated from the switch main body 1, also passes through this transparent plate 9 and heads off to the regressive reflection plate 2. The regressive reflection type photoelectric switch of this embodiment is so-called coaxial regressive reflection type photoelectric switch in which irradiated laser light B is reflected by the regressive reflection plate 2 and thereby, its traveling direction of laser light B is changed by nearly 180°, and returned coaxially.

The regressive reflection plate 2 is formed in the nearly rectangular shape, and its outer circumference is held by a holding plate 10. The regressive reflection plate 2 is mounted at a predetermined mounting position through this holding plate 10. This regressive reflection plate 2 has such a wellknown configuration that a three-dimensional reflection surface was formed by such a matter that a lot of protruding portions of a three-dimensional shape such as a polyangular cone shape (e.g., square cone shape or hexagonal cone shape) and a spherical shape are disposed on a surface on such a side that they are disposed opposite to the switch main body 1. The laser light B, which is irradiated from the switch main body 1, is so-called P polarized light (linear polarized light), and an angle of a polarization plane is changed by 90° on the occasion that the P polarized light is reflected by the regressive reflection plate 2, and thereby, it becomes so-called S polarized light (linear polarized light). In the following, it will be explained about such a case that irradiated light from the switch main body 1 is P polarized light and reflected light from the regressive reflection plate 2 is S polarized light. However, this is one example, and it is all right even if irradiated light from the switch main body 1 is S polarized light and reflected light from the regressive reflection plate 2 is P polarized light.

The light receiving element in the switch main body 1 receives reflected light, only in such a case that reflected light, which is inputted from the light receiving surface 7, is S polarized light. Therefore, if the object 6 does not exist between the switch main body 1 and the regressive reflection plate 2, relatively considerable amount of light received is obtained by the light receiving element, by such a matter that reflected light (S polarized light) from the regressive reflection plate is received by the light receiving element. On the one hand, as shown by a broken line in FIG. 1, in case that the object 6 exists between the switch main body 1 and the regressive reflection plate 2, reflected light is not almost received in the light receiving element. That is, a mirror surface object exists in between the switch main body 1 and the regressive reflection plate 2, P polarized light irradiated from the switch main body 1 does not become S polarized light on the occasion that it is reflected by a mirror surface, and it is reflected as P polarized light without change. Therefore, the reflected P polarized light is not almost received by the light receiving element. In addition, in case that a non-mirror surface object exists in between the switch main body 1 and the regressive reflection plate 2, P polarized light irradiated from the switch main body 1 is not reflected sufficiently by the object, and therefore, reflected light is not almost received by the light receiving element. In this way, according to the regressive reflection type photoelectric switch, in case of either one of a mirror surface object and a non-mirror surface object, it is possible to detect an object favorably on the basis of lowering of an amount of light received in the light receiving element.

Figure 2:
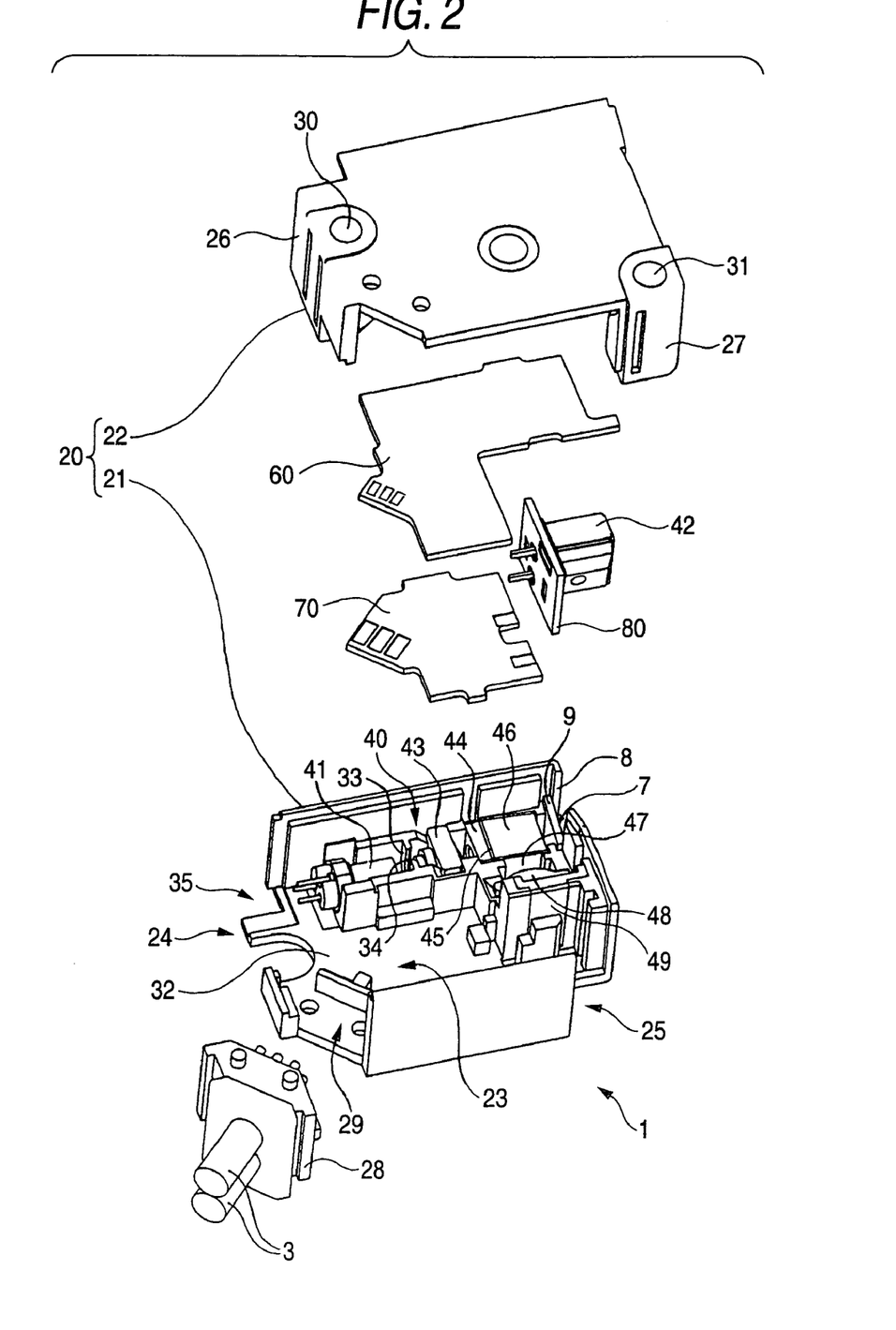
FIG. 2 is an exploded perspective view of a switch main body of FIG. 1.

FIG. 2 is an exploded perspective view of the switch main body 1 of FIG. 1. In the following, for convenience of an explanation, it will be explained on such a premise that an upper side in FIG. 1 is an up direction, and a lower side is a down direction, and a left side is a left direction, and a right side is a right direction.

As to this switch main body 1, its outer shape is laid out by a casing 20 formed in a nearly hollow rectangular solid shape. The casing 20 is formed by connecting a first casing 21 and a second casing 22 each other by adhesive agent. The first casing 21 is a box shaped member of a nearly rectangular shape when it is viewed on a plane surface, in which opening portions 23, 24, 25 are formed on its upper surface, left surface and right front side corner portion, respectively. The second casing 22 is a plate shaped member of a nearly rectangular shape when it is viewed on a plane surface, which corresponds to the opening portion 23 on an upper surface of the first casing 21. On a left side edge and right front side corner portion of the second casing 22, protruding portions 26, 27, which correspond to the opening portions 24, 25 of the first casing 21 respectively, are formed so as to be protruded toward a lower side. Therefore, by mounting the second casing 22 from an upper side so as to cover the opening portion 23 on the upper surface of the first casing 21, it is possible to close the casing 20, except a connector mounting opening 29 for mounting a connector 28 which connects the cable 3 to the switch main body 1, a indicating lamp mounting opening 35 for mounting the indicating lamp 11 and an opening 8 in which the transparent plate 9 is fitted.

In the protruding portions 26, 27 of the second casing 22, through-holes 30, 31, which run through in up and down directions respectively, are formed. By inserting fixing tools such as bolts, into these through-holes 30, 31 to be mounted on a predetermined mounting positions, it is possible to fix the switch main body 1. By forming through-holes 30, 31 in the second casing 22, it is possible to form the opening portions 24, 25 at positions which correspond to the protruding portions 26, 27 of the first casing 21. Therefore, it is possible to carry out focus adjustment of the light emitting element by utilizing the opening portion 24, at the time of fabrication, and therefore, workability at the time of fabrication is improved.

In the first casing 21, components such as an optical system 40, a light emitting circuit substrate 60, a light receiving circuit substrate 70, and a holding substrate 80, are disposed. The optical system 40 includes a light emitting element 41 and a light receiving element 42 and performs irradiation of laser light and light reception. On the light emitting circuit substrate 60, a control circuit of the light emitting element 41 is mounted. On the light receiving circuit substrate 70, a control circuit of the light receiving element 42 is mounted. The holding substrate 80 is connected to the light receiving circuit substrate 70 and holds the light receiving element 42. The optical system 40 includes a light emitting lens 43, a light emitting slit plate 44, a light emitting polarization plate 45, a beam splitter 46, the transparent plate 9, a light receiving polarization plate 47, a light receiving lens 48 and a light receiving slit plate 49, in addition to the light emitting element 41 and the light receiving element 42. These components are incorporated from an upper side to the first casing 21, and thereby, workability at the time of fabrication is improved.

An inner bottom surface of the first casing 21 configures a mounting surface 32 for mounting each component of the optical system 40 and the light receiving circuit substrate 70. On the mounting surface 32, a plurality of ribs, which are protruded toward an upper side, are formed, and by these plural ribs, mounting positions for fitting and mounting each component of the optical system 40 and the light receiving circuit substrate 70 are formed. Components other than the light emitting element 41 among respective components of the optical system 40 and the light receiving circuit substrate 70 are inserted in the firs casing 21 through the opening portion 23 from an upper side, and mounted on the mounting surface 32. On the one hand, the light emitting element 41 is inserted in the first casing 21 from the opening portion 24 toward a right side, and mounted on the mounting surface 32.

The light emitting element 41, the light emitting lens 43, the light emitting slit plate 44, the light emitting polarization plate 45, the beam splitter 46 and the transparent plate 9 (hereinafter, these things are collectively referred to as "light emitting optical system") are disposed in this order, along a rear inner side surface of the first casing, toward an irradiation direction (right direction) of laser light from the light emitting element 41. Here, the rear inner side surface configures a rearward outer circumference wall inner surface of the first casing 21, and the light emitting optical system is mounted on the ribs formed along a rear inner side surface which is an outer circumference wall, respectively. The light receiving polarization plate 47, the light receiving lens 48, the light receiving slit plate 49 and the light receiving element 42 (hereinafter, these things are collectively referred to as "light receiving optical system".) are disposed in this order, along a right inner side surface of the first casing, toward a front side to the beam splitter 46. Here, the right inner side surface configures a rightward outer circumference wall inner surface of the first casing 21, and the light receiving optical system is mounted on ribs formed along a right inner side surface which is an outer circumference wall, respectively.

By this means, each component of the optical system 40 is disposed in a nearly L shape, along a rear inner side surface and a right inner side surface of the first casing 21, in the first casing 21. In other words, a rearward side surface, and a rightward side surface having an edge which intersects with this surface, are formed on the first casing 21, and in an early L shaped space adjacent to these side surfaces, the optical system 40 is disposed in a consolidated fashion. By this means, a disposal area of a circuit etc. other than the optical system 40 is secured as a single space at a maximum, without disposing them in a divided fashion. In addition, by disposing the connector 28 for mounting the cable at a position facing to its intersection point, a distance between the circuit and the connector is shortened, and therefore, effective wiring becomes possible. Furthermore, by disposing the indicating lamp 11 at such a position that a leftward side surface and a rearward side surface intersect with each other, it is possible for a worker to check a detection status from a rear side and an upper side, left and right directions, even after a photoelectric switch was disposed on a factory facility etc., and therefore, visibility is improved.

In addition, by the disposal as described above, it is possible to input only parallel light to the beam splitter 46, in case of either one of light emission and light reception. By this means, it is possible to input all light rays to a light polarization film 53 by an incident angle of nearly 45°, and spectroscopic efficiency of P polarized light and S polarized light is improved. There is such a case that regular reflected light reflected by a mirror surface (reflected light in which light polarization does not change), which should not pass through the beam splitter 46 and the light receiving polarization plate 47 normally, reaches to the light receiving element 42. Therefore, by inputting all light rays to a light polarization film 53 by an incident angle of nearly 45°, it is possible to carry out passage and reflection of light on the light polarization film 53 favorably.

In addition, by disposing the light emitting lens 43 between the light receiving element 41 and the beam splitter 46, and disposing the light receiving lens 48 between the light receiving element 42 and the beam splitter 46, it is possible to prevent disturbance of polarized light by double refraction on the occasion of passing through the lenses 43, 48, and by this means, spectroscopic efficiency of P polarized light and S polarized light is improved. For example, in case that, by use of one lens in common, the light emitting optical system is disposed to this lens, in the order to the lens, the beam splitter and the light receiving element, and the light receiving optical system is disposed in the order of the lens, the beam splitter, and the light receiving element, there is such a case polarized light is disturbed by such a matter that reflected light reflected by a mirror surface passes through the lens, when double refraction occurs in the lenses. In this case, reflected light, in which polarized light is disturbed by passing through the lens, is inputted to the beam splitter, and light, which should not be reflected by a light polarization film normally, is reflected, and reaches to the light receiving element. According to this embodiment, it is possible to prevent disturbance of polarized light due to double refraction on the occasion of passing through the lenses 43, 48, and therefore, it is possible to prevent occurrence of such a matter that reflected light reflected by a mirror surface reaches to the light receiving element.

The light receiving circuit substrate 70 is disposed so as to face to the mounting surface 32 in an area other than such an area on the mounting surface 32 that the optical system 40 is disposed, i.e., a left front side area. The holding substrate 80 is mounted so as to stick up on an upper side, along a right side edge of the light receiving circuit substrate 70, and electrically connected to the light receiving circuit substrate 70 by soldering. In order to connect different length terminals of the light receiving element 42 to the light receiving circuit substrate 70, this holding substrate 80 plays a role of pulling out (wiring) those terminals in a horizontal direction.

The light emitting circuit substrate 60 is disposed so as to be overlapped with a part of the optical system 40, viewed from above, on an upper side in an inside of the first casing 21. More concretely, the light emitting circuit substrate 60 is disposed so as to be overlapped with components other than the transparent plate 9, the light receiving slit plate 49 and the light receiving element 42 among respective components of the optical system 40, and the light receiving circuit substrate 70. In this manner, it is desirable that the light emitting circuit substrate 60 is disposed in the same area on a projection plate as at least the light receiving circuit substrate 70, and in such an area that a thing, which interferes, does not exist at a height position of the light emitting circuit substrate 60 in the first casing 21. Although it is needless to say, if the light receiving element 42 etc. are at such a height that they do not interfere with the light emitting circuit substrate 60, it is possible to have them overlapped with the optical system 40 in an optimized area including other conditions. By this means, the light emitting circuit substrate 60 and the light receiving circuit substrate 70 are disposed in a two-tier fashion, with uniformly spacing them each other, in the first casing 21. The connector 28 is electrically connected to the light emitting circuit substrate 60 and the light receiving circuit substrate 70, by soldering, respectively.

In this embodiment, each component of the optical system 40 is mounted on the mounting surface 32, and thereby, disposed in a space of approximately half of a lower side in the first casing 21. Therefore, the light receiving surface 9, which is configured by the transparent plate 9, is disposed in an area of approximately half of the lower side on a right side surface of the first casing 21, and as shown in FIG. 1, it is turned into such a situation that, when the switch main body 1 is viewed from the regressive reflection plate 2 side, the light receiving surface 7 is leaned to one side in a thickness direction of the casing 20 (such a direction that the first casing 21 and the second casing 22 are lined up). By leaning to one side in this way, a margin level in a height direction, by which the light emitting circuit substrate 60 can be overlapped with the optical system 40, is allowed.

Figure 3:
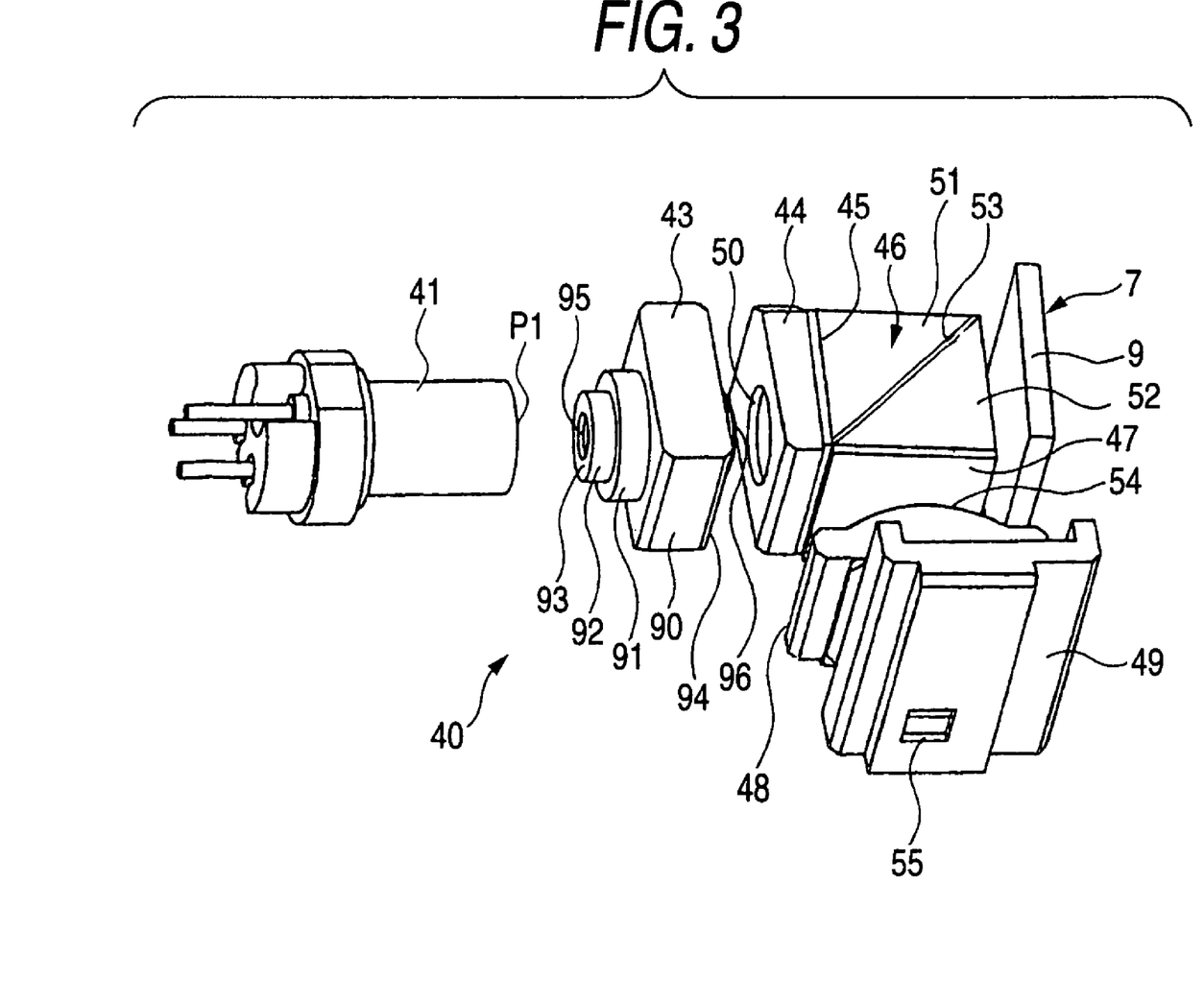
FIG. 3 is a perspective view which shows a configuration of an optical system, and shows it by omitting a light receiving element which is one constituent component of the optical system.
Figure 4:
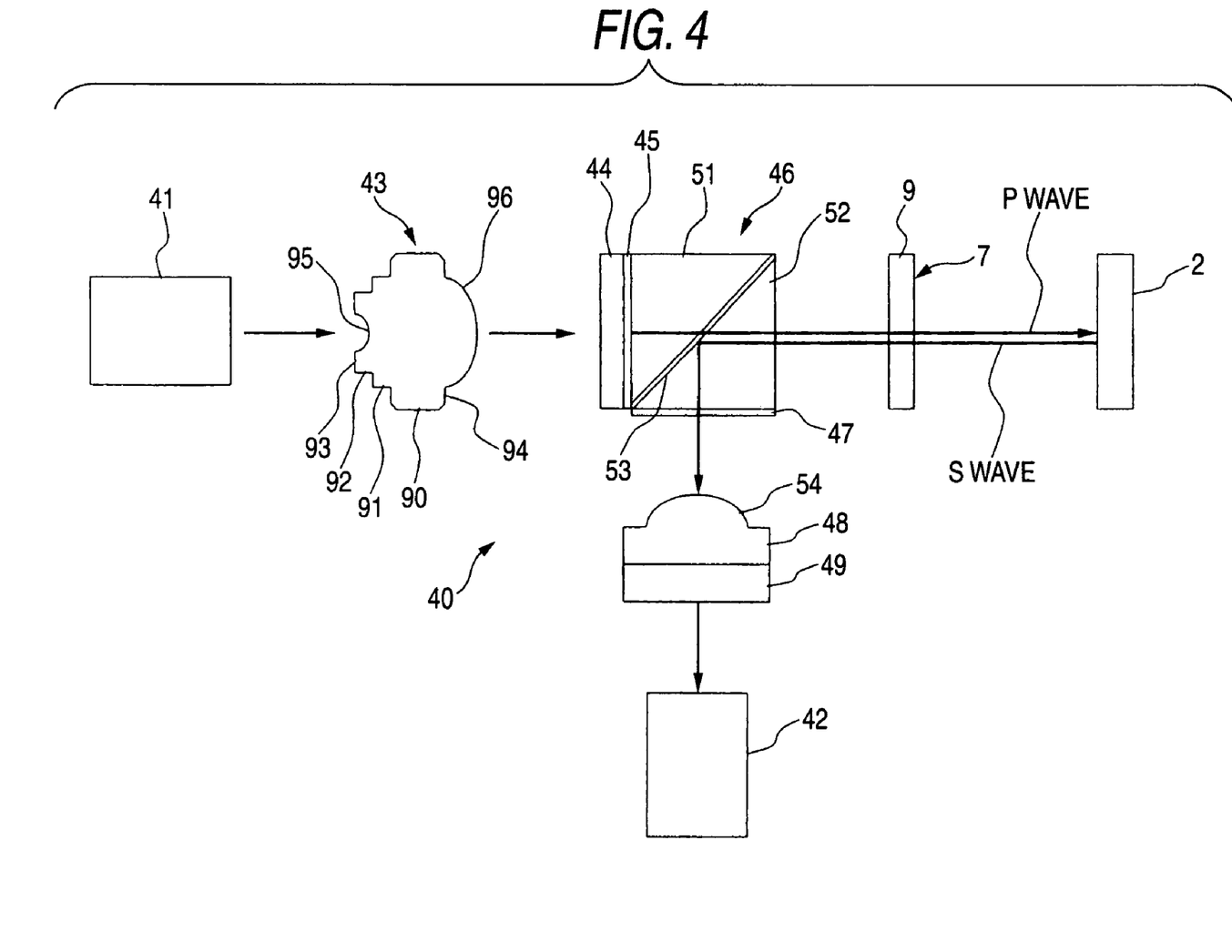
FIG. 4 is a schematic light path view which shows such a light path that laser light irradiated from a light emitting element is received by the light receiving element.

FIG. 3 is a perspective view which shows a configuration of the optical system 40 of FIG. 2, and it is shown by omitting the light receiving element 42 which is one constituent component of the optical system 40. In addition, FIG. 4 is a schematic light path view which shows such a light path that laser light irradiated from the light emitting element 41 is received by the light receiving element 42.

The light emitting element 41 is configured by a laser diode, and irradiates laser light toward a right direction in FIG. 3. The light emitting lens 43 converts the laser light irradiated from the light emitting element 41 into nearly parallel light, and emits it. A part of laser light irradiated from the light emitting lens 43 passes through a nearly circular shaped slit 50 formed in the light emitting slit plate 44, and is guided to the light emitting polarization plate 45. In this way, laser light passes through the slit 50, and thereby, it is possible to limit an irradiation range of laser light to a nearly circular spot shape.

The beam splitter 46 is formed as a nearly cube shape in which a length of one edge is approximately 3.5 mm, by contacting nearly the same two prisms 51, 52 having nearly triangular pole shape and connecting them each other. The light emitting polarization plate 45 contacts to a left side surface of one prism 51, and is sandwiched in between the prism 51 and the light emitting slit plate 44. In addition, the light receiving polarization plate 47 contacts to a front side surface of the other prism 52. Between contact surfaces of the two prisms 51, 52, the light polarization film 53 is sandwiched so as to be extended in a 45° inclined surface to an irradiation direction of laser light.

The light emitting polarization plate 45 allows passage of only P polarized light among laser light inputted. Therefore, only P polarized light, among laser light passed through the slit 50 of the light emitting slit plate 44, passes through the light emitting polarization plate 45, and is inputted to the beam splitter 46. The light polarization film 53 of the beam splitter 46 allows passage of only P polarized light among laser light inputted from the light emitting element 41 side (left side). In this way, laser light passes through the light emitting polarization plate 45 and the light polarization film 53 which allow passage of only P polarized light respectively, and thereby, it is possible to detect only P polarized light from laser light, with high accuracy.

Laser light (P polarized light), which passed through the light polarization plate 53 of the beam splitter 46, is emitted from a right side surface of the beam splitter 46, and passes through the transparent plate 9. By this means, laser light is irradiated from the switch main body 1 toward the regressive reflection plate 2, and if the object 6 does not exist between the switch main body 1 and the regressive reflection plate 2, irradiated laser light is reflected by the regressive reflection plate 2 without being blocked by the object 6. Laser light is converted from P polarized light into S polarized light, as described above, on the occasion that it is reflected by the regressive reflection plate 2.

Reflected light (S polarized light) from the regressive reflection plate is inputted from the light receiving surface 7 to the switch main body 1. The light receiving surface 7 is formed in a nearly square shape in which a length of one edge is approximately 3.5 mm. A distance from an irradiation point P1 of the light emitting element 41 to the light receiving surface 7 is approximately 10 mm. Reflected light, which was inputted from the light receiving surface 7 to the switch main body 1, passes through the transparent plate 9, and reaches to the beam splitter 46. The light polarization film 53 of the beam splitter 46 reflects only S polarized light among laser light inputted from the regressive reflection plate 2 side (right side). Therefore, laser light, which was inputted to a right side surface of the beam splitter 46, is reflected by the light polarization film 53, and thereby, a traveling direction of laser light is changed by 90°, and heads off to the light receiving polarization plate 47 side. The light receiving polarization plate 47 allow passage of only S polarized light among laser light inputted. In this way, laser light is reflected by the light polarization film 53 which reflects only S polarized light, and passes through the light receiving polarization plate 47 which allows passage of only S polarized light, and thereby, it is possible to extract only S polarized light from laser light, with high accuracy.

Laser light (S polarized light), which passed through the light receiving polarization plate 47, is inputted to the light inputting surface 54 of the light receiving lens 48. On the light inputting surface 54 of the light receiving lens 48, a spherical shaped convex curved surface is formed, and laser light is focused by passing through this convex curved surface. A part of laser light, which was focused by passing through the light receiving lens 48, passes through the nearly rectangular shaped slit 55 formed in the light receiving slit plate 49, and is received by the light receiving element 42 which is configured by a photodiode. In this way, laser light passes through the slit 55, and thereby, it is possible to block entrance of disturbance light such as sun light and light from a fluorescent lamp, Data of a received light amount of laser light received by the light receiving element 42 is transmitted to the controller 4 through the cable 3. The controller 4 comprises CPU (not shown in the figure), and this CPU compares received data of a received light amount with a predetermined threshold value, and thereby, detects presence and absence of the object 6 between the switch main body 1 and the regressive reflection plate 2. That is, CPU judges that the object 6 does not exist if a received light amount is the predetermined threshold value or more, and judges that the object 6 exists if a received light amount is less than the predetermined threshold value.

Dimensions of the switch main body 1 depend on dimensions of each component of the optical system 40 and a disposal configuration, and dimensions of other components such as the light emitting circuit substrate 60, the light receiving circuit substrate 70 and the holding substrate 80, and disposal configurations, etc. The switch main body 1 of this embodiment is miniaturized very much as compared to a conventional one, in such a manner that a length L1 along an irradiation direction from the light emitting element 41 is set to approximately 23 mm, and a length L2 along a light emitting direction to the light receiving element 42 is set to approximately 18 mm, and a length L3 in a direction (thickness direction) intersecting with these directions L1, L2 is set to approximately 8,5 mm, as shown in FIG. 1, by devising these dimensions and disposal configurations.

Figure 5:
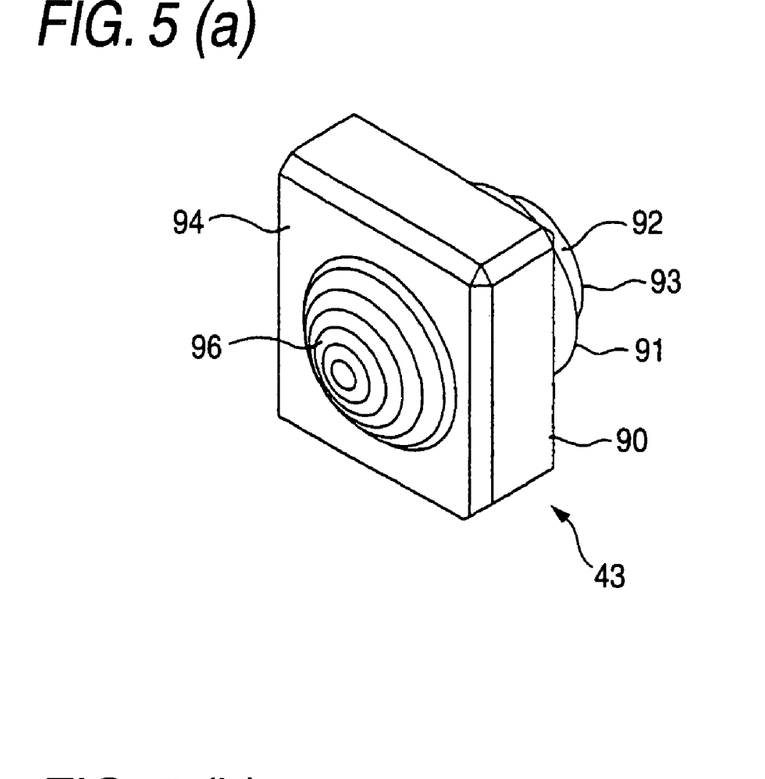

FIGS. 5 (a) and (b) are perspective views of the light emitting lens 43 of FIG. 3. FIG. 5(a) shows a perspective view from the side opposite to the light emitting element 41, and FIG. 5(b) shows a perspective view from the light emitting element 41 side. This light emitting lens 43 is configured in such a manner that a main body portion 90, a nearly circular pole shaped first protruding portion 91, and a nearly circular pole shaped second protruding portion 92, are integrally molded by transparent resin or glass. The main body portion 90 is formed in a nearly rectangular shape when it is viewed on a plane surface, from the light emitting element 41 side. The nearly circular pole shaped first protruding portion 91 is protruded from a surface of this main body portion 90 on the side of the light emitting element 41 toward the light emitting element 41 side. The nearly circular pole shaped second protruding portion 92 is protruded on the same axis line from a surface of this first protruding portion 91 on the side of the light emitting element 41 toward the light emitting element 41 side, and is of a smaller diameter than that of the first protruding portion 91. On a step portion formed by the second protruding portion 92, it is possible to dispose a slit for blocking such a matter that light is inputted to a portion other than a concave curved surface 95 of a light inputting surface 93, which will be described later.

A surface of the second protruding portion 92 on the side of the light emitting element 41 configures the light inputting surface 93 to which laser light, that was irradiated from the light emitting element 41, is inputted. In addition, a surface of the main body portion 90 on the side opposite to the light emitting element 41 configures the light emitting surface 94 which converts laser light into nearly parallel light and emits it. A distance of the light inputting surface 93 and the light emitting surface 94 is approximately 2.7 mm. On the light inputting surface 93, the spherical shaped concave curved surface 95, which is concave to the side opposite to the light emitting element 41, is formed. On the one hand, on the light emitting surface 94, a spherical shaped convex curved surface 96, which overhangs to the side opposite to the light emitting element 41, is formed.

The concave curved surface 95 is of a nearly circular shape with a diameter of approximately 0.78 mm when it is viewed on a plane surface from the light emitting element 41 side, and a curvature radius is approximately 0.53 mm. On the one hand, the convex curved surface 96 is of a nearly circular shape with a diameter of approximately 2.6 mm when it is viewed on a plane surface from the side opposite to the light emitting element 41, and a curvature radius is approximately 1.96 mm. In this manner, when it is viewed on a plane surface, an area of the concave curved surface 95 is formed so as to become smaller than an area of the convex curved surface 96. It is preferable that a diameter of the concave curved surface 95 is approximately one third through one fourth of a diameter of the convex curved surface 96. This is because it is not possible to measure surface accuracy in relation to another measurement device, unless the above-mentioned diameter range is not satisfied, from a viewpoint of molding a lens. In addition, when a displacement error is taken into consideration, in order to carry out light blocking of a portion other than the concave curved surface 95 by black silk printing, it is reasonable to form the concave curved surface 95 with the above-mentioned diameter range. The concave curved surface 95 and the convex curved surface 96 are disposed in such a manner that respective center axis lines are allocated on the same straight line along an irradiation direction of laser light.

Figure 6:
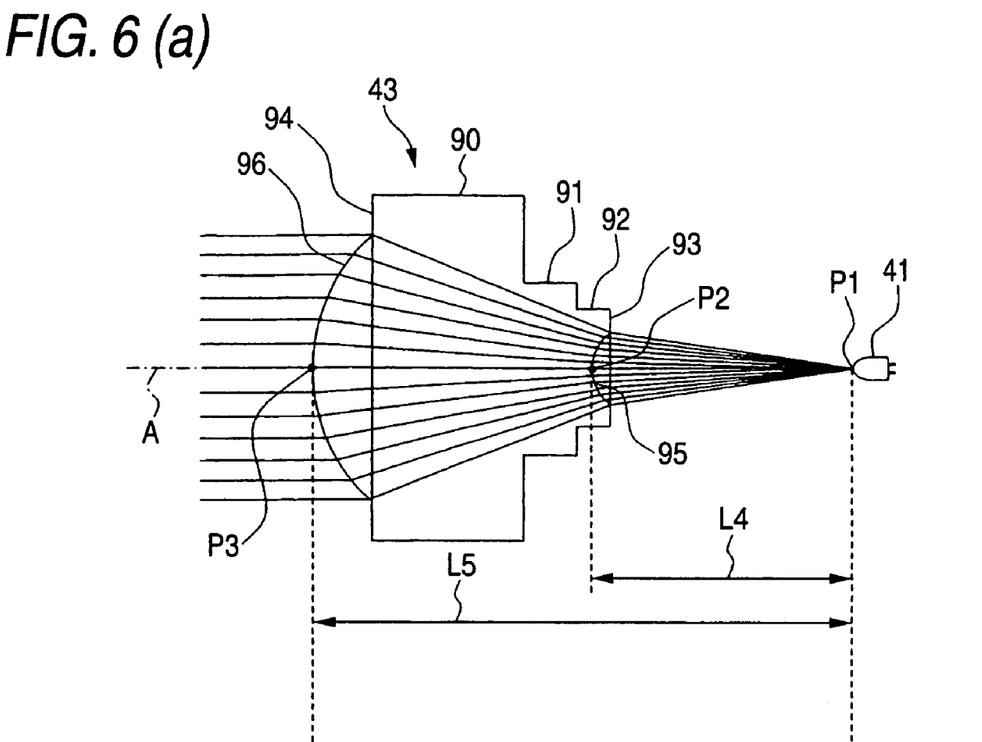

FIGS. 6 (a) and (b) schematic light path views each of which shows an appearance of laser light on the occasion of passing through the light emitting lenses 43, 143. FIG. 6(a) shows a case by use of the light emitting lens 43 in this embodiment and FIG. 6(b) shows a case by use of the light emitting lens 143 in related art. As shown in FIG. 6, laser light, which is irradiated from the light emitting element 41, is inputted to the light emitting lenses 43, 143 over spreading by a predetermined angle (spread angle) to its optic axis A.

In FIG. 6 (a), laser light, which was irradiated from the light emitting element 41, is inputted to the concave curved surface 95 of the light inputting surface 93. A spread angle of laser light is enlarged on the occasion of inputting from the concave curved surface 95 to an inside of the light emitting lens 43, and passes through an inside of the light emitting lens 43 by the enlarged spread angle. A shape (diameter) of the convex curved surface 96 of the light emitting surface 94 is set up so as to corresponds to such a range that laser light, in which a spread angle was enlarged by the convex curved surface 95, reaches to the light emitting surface 94, in case that laser light is inputted to the entire convex curved surface 95 of the light inputting surface 93. Therefore, almost all of laser light, which reached from the light inputting surface 93 to the light emitting surface 94, is emitted through the convex curved surface 96. As to laser light emitted from the light emitting lens 43, a spread angle is reduced on the occasion that it passes through the convex curved surface 96, and becomes nearly parallel light. A distance L4 from an irradiation point of the light emitting element 41 up to a bottom point P2 of the concave curved surface 95 is approximately 3 mm. In addition, a distance L5 from the irradiation point P1 of the light emitting element 41 up to a top point P3 of the convex curved surface 96 is approximately 6 mm.

The light emitting lens 143 of related art shown in FIG. 6 (b) has such a shape that the light inputting surface 193 on the light emitting element 41 side is formed by a flat surface, and a convex curved surface 195 is formed on a light emitting surface 194 on the side opposite to the light emitting element 41. A distance of the light inputting surface 193 and the light emitting surface 194 is approximately 1.3 mm. In addition, the convex curved surface 195 is of a nearly circular shape with a diameter of approximately 2.6 mm when it is viewed on a plane surface from the light emitting element 41 side, and a curvature radius is approximately 3.5 mm. A distance from the irradiation point P1 of the light emitting element 41 up to a top point P4 of the convex curved surface 195 is approximately 6 mm which is the same as the distance L5 from the irradiation point P1 up to the top point P3 of the convex curved surface 96 in the light emitting lens 43 of FIG. 6 (a). In this regard, however, as the light emitting lens of related art, in addition to a thing of such a shape that the light inputting surface 193 is formed by a flat surface as described above and the convex curved surface 195 is formed on the light emitting surface 194, a thing of such a shape that a convex curved surface is formed on a light inputting surface and a light emitting surface is formed by a flat surface has been also known.

In FIG. 6 (b), laser light, which was irradiated from the light emitting element 41, is inputted to the light inputting surface 193 which is composed of a flat surface, and passes through an inside of the light emitting lens 143 without almost no change of its spread angle. Then, as to laser light reached to the convex curved surface 195 of the light emitting surface 194, a spread angle is reduced on the occasion of passing through the convex curved surface 195, and it becomes nearly parallel light. Each light emitting lens 43, 143 shown in FIGS. 6 (a) and (b) has a different shape, respectively, but an irradiation range of nearly parallel light, which is emitted from each light emitting surface 94, 194, is almost the same.

Figure 7:
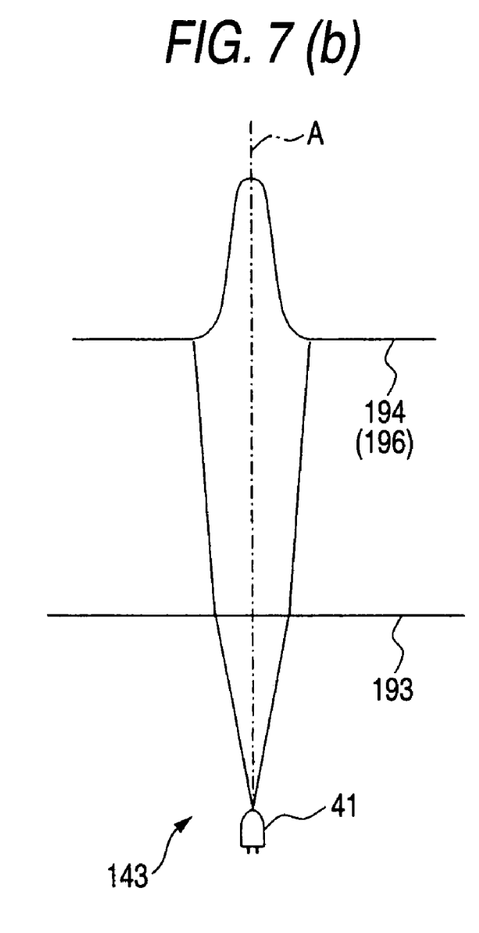

FIGS. 7 (a) and (b) views each of which schematically shows intensity distribution of laser light on the occasion of passing through each light emitting lens 43, 143 of FIGS. 6 (a) and (b). FIG. 7 (a) shows a case by use of the light emitting lens 43 of this embodiment, and FIG. 7(b) shows a case by use of the light emitting lens 143 of related art.

Firstly, the light emitting lens 143 of related art shown in FIG. 7 (b) will be explained. In this light emitting lens 143, the light inputting surface 193 is formed by a flat surface, and therefore, as described above, laser light, which was inputted to the light inputting surface 193, reaches to the light emitting surface 194 without almost no change of a spread angle. Laser light has such a characteristic that the more it is proximate to the optic axis A, the more its intensity distribution becomes uniform, and the more it is separated from the optic axis A, the more its intensity distribution becomes non-uniform. If a spread angle is not changed like this light emitting lens 143, laser light reaches to the light emitting surface 194 over keeping a ratio of intensity distribution on the occasion that it was irradiated from the light emitting element 41. Therefore, intensity distribution of laser light, which reached to the light emitting surface 194, is uniform to a certain degree in a range close to the optic axis A, as shown in FIG. 7 (b), but shows such intensity distribution that if it is separated from the optic axis A little bit, intensity comes down rapidly. If a distance of the light emitting element 41 and the light emitting lens 143 is widened, it is possible to make intensity distribution of laser light which reaches to the light emitting surface 194 more uniform, but in case that the above-mentioned distance L5 is set to a constant small value from a constraint due to miniaturization of the optical system 40, non-uniform intensity distribution as shown in FIG. 7 (b) is obtained.

On the one hand, in the light emitting lens 43 of this embodiment shown in FIG. 7 (a), only laser light in a range S close to the optic axis A, among laser light irradiated from the light emitting element 41, is inputted to the convex curved surface 95 of the light inputting surface 93. Laser light in this range S shows more uniform intensity distribution as compared to laser light in a range other than that (range separated from the optic axis A). In this manner, when only laser light having more uniform intensity distribution in the range S is enlarged by the convex curved surface 95, intensity distribution of laser light reached to the light emitting surface 94 becomes, as shown in FIG. 7 (a), intensity distribution in which the uniform range S to the optic axis A was enlarged.

As apparent from the above-mentioned comparison result, according to this embodiment, only laser light close to the optic axis A is inputted, and its spread angle is enlarged, and thereby, it is possible to emit nearly parallel light in which intensity distribution is more uniform, from the convex curved surface 96. If intensity distribution of light, which is emitted from the light emitting lens 43, is uniform, it is possible to reduce an error on the occasion of comparing a received light amount of reflected light with a threshold value, and therefore, it is possible to detect the object 6 with high accuracy, even if the light receiving surface 7 of reflected light in the switch main body 1 is small. In addition, also in case that the regressive reflection plate 2 is vibrating, fluctuation quantity of a received light amount in the light receiving element 32 is few, and it is possible to detect the object 6 favorably. Therefore, even if the switch main body 1 is miniaturized by reducing the light receiving surface 7, it is possible to detect the object 6 with high accuracy.

In addition, in case of such a configuration that the beam splitter 46 is disposed on the same straight line as the light emitting element 41 and the light emitting lens 43, like this embodiment, it is not possible to ensure a very large distance between the light emitting element 41 and the light emitting lens 43, in order to miniaturize the switch main body 1, but by enlarging a spread angle of laser light inputted from the light emitting element 41 to the light emitting lens 43 through the use of the concave curved surface 95, it is possible to obtain nearly parallel light having a sufficient irradiation range on the convex curved surface 96. In addition, by utilizing the concave curved surface 95, it is possible to make intensity distribution in the irradiation range uniform, and therefore, it is possible to obtain the same advantage as in the case that the light emitting element 41 and the light emitting lens 43 are separated in terms of a distance. Therefore, even in case of a configuration equipped with a beam splitter 46, it is possible to realize miniaturization over keeping an irradiation range and intensity distribution in the irradiation range, and it is possible to reduce deviance of an optic axis which goes with enlargement of a distance of the light emitting element 41 and the light emitting lens 43, and therefore, it is possible to provide a small side regressive reflection type photoelectric switch which can detect the object 6 with high accuracy.

In this embodiment, as shown in FIG. 2, the slit 34, through which laser light heading off from the light emitting element 41 to the light emitting lens 43 is formed on the rib 33 disposed between the light emitting element 41 and the light emitting lens 43. This slit 34 has a shape which corresponds to a shape of the concave curved surface 95 of the light emitting lens 43. That is, a shape of the slit 34 is set up in such a manner that it is possible to irradiate laser light only to the concave curved surface 95 of the light emitting lens 43, by such a matter that laser light heading off from the light emitting element 41 to the light emitting lens 43 passes through the slit 34. By this means, it is possible to suppress noises at the time of detection, which are generated by such a matter that laser light is inputted to a portion other than the concave curved surface 95 on the light inputting surface 93 of the light emitting lens 43, and therefore, it is possible to detect the object 6 with higher accuracy. In this way, by adopting the light emitting lens 43 utilizing the above-described concave curved surface 95, miniaturization of the optical system 40 also becomes possible. In addition, there is no case of blocking miniaturization by disposal of the above-described circuit substrate etc., by miniaturization of the optical system 40, and therefore, overall miniaturization of a photoelectric switch becomes possible.

The present invention is not limited to contents of the above-described embodiments, and various modifications in a scope described in claims are possible.

What is claimed is:

1. A regressive reflection type photoelectric switch which receives a reflected light from a regressive reflection plate comprising:
    a light emitting element which irradiates laser light;
    a light receiving element which receives the reflected light of the laser light, which is reflected by the regressive reflection plate;
    a light emitting lens which collimates the laser light, which has a positive spread angle, the light emitting lens having a concave curved surface to which the laser light, which is irradiated from the light emitting element, is inputted, and a convex curved surface from which the collimated laser light is emitted;
    and a slit through which a portion of the laser light which is irradiated from the light emitting element to the concave curved surface of the light emitting lens passes, and which blocks the other portion of the laser light;
    wherein a concave curved surface is formed of a nearly spherical shape, the convex curved surface is formed of a nearly spherical shape, and area of the concave curved surface is smaller than an area of the convex curved surface.

2. The regressive reflection type photoelectric switch as set forth in claim 1, further comprising:
    a beam splitter which allows passage of the laser light from the light emitting lens toward the regressive reflection plate, and reflects reflected light by the regressive reflection plate toward the light receiving element.

3. The regressive reflection type photoelectric switch as set forth in claim 2, wherein the beam splitter allows passage of only predetermined linear polarized light toward the regressive reflection plate, and reflects only reflected light, whose a polarization plane was changed by the regressive reflection plate, toward the light receiving element.

4. The regressive reflection type photoelectric switch according to claim 1, further comprising a light receiving lens having a convex lens.

* * * * *